US008158232B2

(12) United States Patent
Gold et al.

(10) Patent No.: US 8,158,232 B2
(45) Date of Patent: Apr. 17, 2012

(54) FOLDABLE CHAIR PAD

(75) Inventors: Darryl S. Gold, Chesterfield, MO (US); Jeff Gold, Chesterfield, MO (US)

(73) Assignee: GFH Enterprises, Inc., St. Louis, MO (US)

( * ) Notice: Subject to any disclaimer, the term of this patent is extended or adjusted under 35 U.S.C. 154(b) by 265 days.

(21) Appl. No.: 12/460,841

(22) Filed: Jul. 23, 2009

(65) Prior Publication Data

US 2009/0311447 A1 Dec. 17, 2009

Related U.S. Application Data

(63) Continuation-in-part of application No. 11/468,290, filed on Aug. 29, 2006, now abandoned.

(60) Provisional application No. 60/741,990, filed on Dec. 2, 2005.

(51) Int. Cl.
*B32B 3/10* (2006.01)

(52) U.S. Cl. ............................... 428/55; 428/54; 428/61

(58) Field of Classification Search .................... 428/55, 428/54, 56, 61, 77
See application file for complete search history.

(56) References Cited

U.S. PATENT DOCUMENTS

| | | | | |
|---|---|---|---|---|
| 945,575 | A | 1/1910 | McPherson | |
| 1,659,141 | A | 2/1928 | Grupp | |
| 1,682,860 | A | 9/1928 | Soss | |
| 2,608,713 | A | 9/1952 | Soss | |
| 4,301,207 | A | 11/1981 | Schomerus | |
| 4,608,798 | A | 9/1986 | Spiers | |
| 4,940,620 | A * | 7/1990 | Silk et al. | 428/81 |
| 5,456,964 | A | 10/1995 | Tamura et al. | |
| 5,916,105 | A | 6/1999 | Gow | |
| 5,942,321 | A | 8/1999 | Romesberg et al. | |
| 6,103,333 | A | 8/2000 | Keith | |
| 7,361,616 | B2 | 4/2008 | Gold | |
| 7,402,536 | B2 | 7/2008 | Gold | |
| 2001/0046578 | A1 | 11/2001 | Frost | |
| 2005/0035633 | A1 * | 2/2005 | Robbins, III | 297/182 |
| 2006/0165954 | A1 | 7/2006 | Gold | |

* cited by examiner

*Primary Examiner* — Alexander Thomas
(74) *Attorney, Agent, or Firm* — Paul M. Denk

(57) ABSTRACT

A chair pad has foldable panels for movement and shipment. A hard wood chair pad forms from multiple elongated rigid planks, processed like hardwood flooring. The chair pad provides a substantially rigid surface that folds easily for transport and shipping. The rigid planks utilized in the chair pad, similar to hardwood flooring planks, have sufficient thickness such that when they are bonded in an adjacent side by side abutting manner along the longer lengthwise edges similar to some hardwood flooring and further bonded to a backing in an adjacent side by side manner, the planks form a substantially rigid surface. The planks connect adjacently lengthwise along their long side edges.

4 Claims, 10 Drawing Sheets

FOLDABLE CHAIR PAD

CROSS-REFERENCE TO RELATED APPLICATION

This continuation-in-part application claims priority to the non-provisional application for patent with Ser. No. 11/468,290, filed Aug. 29, 2006, now abandoned, which claims priority to the provisional application for patent Ser. No. 60/741,990, filed Dec. 2, 2005, now expired, which are commonly owned by the same assignee.

BACKGROUND OF THE INVENTION

This invention relates generally to chair pads and, more particularly, to wood chair pads.

Chair pads serve as a protective covering for a floor area on which a chair or some furniture rests. The chair pad protects the underlying floor from damage due to wear and tear caused by the chair and the occupant of the chair moving upon the floor area on which the chair rests. A typical chair pad has polymer or plastic construction.

Most chair pads have a unitary one piece flattened body. Very few chair pads come from wood products and none are mass produced. Hardwood chair pads, however, remain rigid. Existing wood chair pads, particularly larger ones, cause difficultly in moving and more difficulty in shipping because of the special packaging required and freight restraints. Shippers, such as UPS and FedEx generally do not transport rigid wood chair pads.

Not deterred by shipping constraints, the chair mats of the Applicants use hardwood materials such a various species of bamboo, cherry, oak or mahogany, teak and rubber tree, for manufacturing into a chair pad of the present invention. Bamboo and teak have many uses, particularly as a substitute for wood, plastic, and composite materials in structural and product applications.

DESCRIPTION OF THE PRIOR ART

Various types of bamboo and teak flooring exist and have various connecting joinery such as tongue and groove, butt, and mortise and tenon. The lacquered flooring tiles have a finish with wear resistant UV coating or polyurethane while non-lacquered flooring tiles require coating, waxing, and polished after installation. The strength of bamboo and teak boards often exceeds common wood boards because of its special high steam kiln pressure process. The bamboo board has excellent water resistance because of its reduced shrinking and expanding rate. Bamboo's water absorbing rate, humidity resistance and smooth finish far exceed that of any wood product available anywhere.

Also, various types of hardwood or bamboo chair pads have a construction of flat elongated planks or strips arranged side by side length wise and attached along abutting adjacent edges, thus binding them together in a side by side arrangement. Existing chair pads also have a cloth or felt backing or some other fibrous material bonded to the underside, subject to co-pending patent applications of the Applicants.

The bamboo and other hardwood material has high durability, well suited for chair pad application, however, the construction of many existing bamboo pads remains rigid, that is lacking the capability to flex or bend. A novel bamboo chair pad construction is needed and is found in this patent application.

SUMMARY OF THE INVENTION

The invention is a hard wood chair pad formed from multiple elongated rigid planks, processed like flooring of hardwood or other materials, to form panels of the foldable chair pad. The chair pad provides a substantially rigid surface that folds easily for transport and shipping. The rigid planks utilized to construct the chair pad panels have similarities to the planks in hardwood flooring. The planks have sufficient thickness such that upon bonding in an adjacent side by side manner lengthwise and further bonded to a backing in an adjacent side by side manner, the planks form a substantially rigid surface that withstands chair usage. The planks may connect adjacently along their long side edges, and further connect end to end along the short side edges. Though this application groups bamboo with other species of wood for use in one embodiment of the chair pad, the scientific, particularly the botanical, community considers as a grass and not a wood.

The planks, upon assembly, form, rigid panel sections hinged together such that they fold upon an adjacent panel. The chair pad can also have a construction of two or more foldable hinged panels. The embodiment shown in the drawings herein includes a center panel and left and right side wing panels, each hinged on opposing sides of the center panel. The left side panel can adjacently connect by a hinge to the left side of the center panel lengthwise along their mutual side edges. Similarly, the right panel can adjacently connect by a hinge to the right side of the center panel lengthwise along their mutual side edges. The hinged attachment of the side panels makes them foldable left and right side wings, or flaps, of the chair pad such that the side flaps fold over and onto the center panel for ease of movement and shipping.

Various recessed hinges, well known in the art, attach the chair pad panels without departing from the scope of the invention. Recessed hinges, that is recessed or counter sunk into a recess extending inward from the side edge of a panel, generally do not appear to users, when the chair pad is placed on the floor with its flaps extended. Also the seam or space between adjacent panels escapes notice by users. One embodiment of a recessed hinge as disclosed herein includes left and right mounting members where each of the mounting members has a support plug portion for insertion into a recess. The support plug has a mounting flange plate attached to one end. The mounting members have cut out areas in the mounting flange plate and plug portion for receiving a cross-link support arm. The recessed hinge can have multiple cross-link support arms, pivotally interconnected by a bearing pin or hinge pin at intermediate portions. One end of each support arm may have pivotal journaling to one of the mounting members and the opposing end may have a pivotal connection to a cam-follower hinge pin, where the cam-follower hinge pin slides within a longitudinal slot within the plug portion of the mounting member. The recessed hinge pivotally attaches two panels of a chair pad in a side by side manner. This type of hinge offers a stronger and more stable office chair mat.

The bamboo chair pad includes 100% Anji Mountain bamboo from China as one of its materials of manufacture. The bamboo, treated with various protective coatings, to add resistance to natural factors including water, sun and dirt. All bamboo chair pads are made from the harder portions of the bamboo trunk. (Some bamboo used for indoor purposes are manufactured from the softer fibers of the inside of the bamboo trunk). This portion of the bamboo trunk is not utilized for this invention. The bamboo utilized in the present invention can be taken from the harder part of the bamboo trunk to assure maximum endurance and longevity. The bamboo used may be horizontal, vertical or braided (twisted) bamboo. These terms refer to the actual process and physical characteristics of the bamboo. The lower trunk portion of the bamboo plant is harder and less porous. Other wood having sufficient hardness and strength or other materials can also be utilized to manufacture the planks and the panels.

Kiln drying of the bamboo for the present invention reduces the chance of warping and removes moisture that can cause future warping. Certain styles of bamboo undergo oxidation in a boiling vat of liquid to bring out different variations of color in contrast to the common method of spray staining the bamboo planks to a particular color. The oxidation process also makes the bamboo less porous to moisture. An ultraviolet coating can also be applied to the bamboo planks. One embodiment of the invention can have seven coats of ultraviolet protection or a number of coats of polyurethane. Arranging the bamboo as a series of planks lying next to one another, the bamboo assembles into a chair pad utilizing the same manufacturing processes and machinery utilized for some hardwood flooring.

One embodiment of the invention includes a chair pad with at least two hinged, foldable, side by side, panels where at least one recessed hinge pivotally attaches the at least two foldable panels. Further the at least one recessed hinge has first and second mounting members pivotally hinged with respect to each other. The first and second mounting members each have opposite mounts and are counter sunk in opposing recesses extending inwardly into opposing facing adjacent side edges of the at least two hinged foldable side by side adjacent panels. The first and second mounting members each can have a central cavity area. This embodiment also includes at least one cross-link support arm pivotally attaching the first and second mounting members, where the cross-link support arm members substantially retract within the central cavity when the foldable panels pivotally extend to an abutting side edge by side edge relationship such that the at least one recessed hinged remains substantially hidden from view.

Another embodiment of the invention can be a foldable chair pad that has a center panel, a left side panel pivotally attached to the center panel at a left side edge of the center panel and an adjacent side edge of the left side panel and a right side panel pivotally attached to the center panel at a right side edge of the center panel opposite the left side edge and an adjacent edge of the right side panel. The left side panel and the right side panel pivotally attach to the center panel by left and right recessed hinges respectively. The left recessed hinge has first and second mounting members that are pivotally hinged with respect to each other and the right recessed hinge has third and fourth mounting members that are pivotally hinged with respect to each other. The first and second mounting member have opposite mounts and are counter sunk in opposing recesses extending inwardly into opposing facing adjacent side edges of left side panel and the center panel. The third and fourth mounting member have opposite mountings and are counter sunk in opposing recesses extending inwardly into opposing facing adjacent side edges of the right side panel and the center panel.

The construction of the present invention provides a product easily packaged, transported, shipped and moved about. The product includes flexibility of the chair pad and the ability to fold. These and other advantageous features of the present invention will be in part apparent and in part pointed out herein below.

Numerous objects, features and advantages of the present invention will be readily apparent to those of ordinary skill in the art upon a reading of the. following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

Therefore the object of the present invention is to provide a foldable chair pad that folds without showing hinges.

Another object of the foldable chair pad is to provide a pad that folds for easy shipping and handling from manufacturer to end customer.

Another object of the foldable chair pad is to provide a pad that assembles from bamboo manufactured on existing flooring machinery and equipment.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
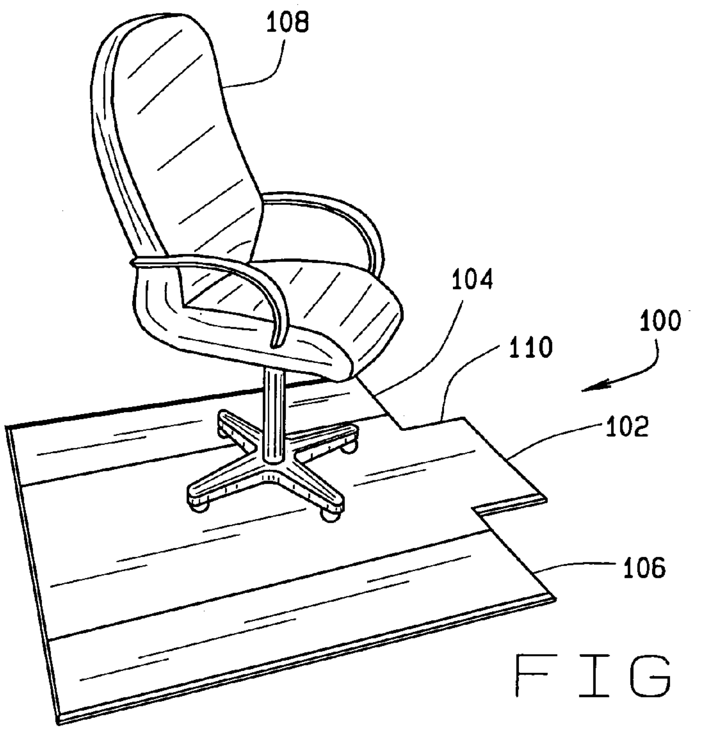
FIG. 1 is a perspective view of the chair pad with a chair resting thereon.

The present art overcomes the prior art limitations by assembling a chair pad from bamboo that readily folds but does not show its hinges. One embodiment of the present invention includes a center panel, and a left and a right hand wood panel hingedly interconnected to form a chair pad and teaches a novel apparatus and method for a chair pad that is highly flexible for movement and shipment. Referring to FIG. 1, a perspective view of the chair pad shows a typical office chair resting thereon. FIG. 1 represents the chair paid 100 lying on a flat surface with a chair 108 resting thereon. This embodiment of the chair pad has a center panel 102 and a left side panel 104 and a right side panel 106. The center panel has an extension portion 110 which extends beyond the left and right side panels.

Figure 2:
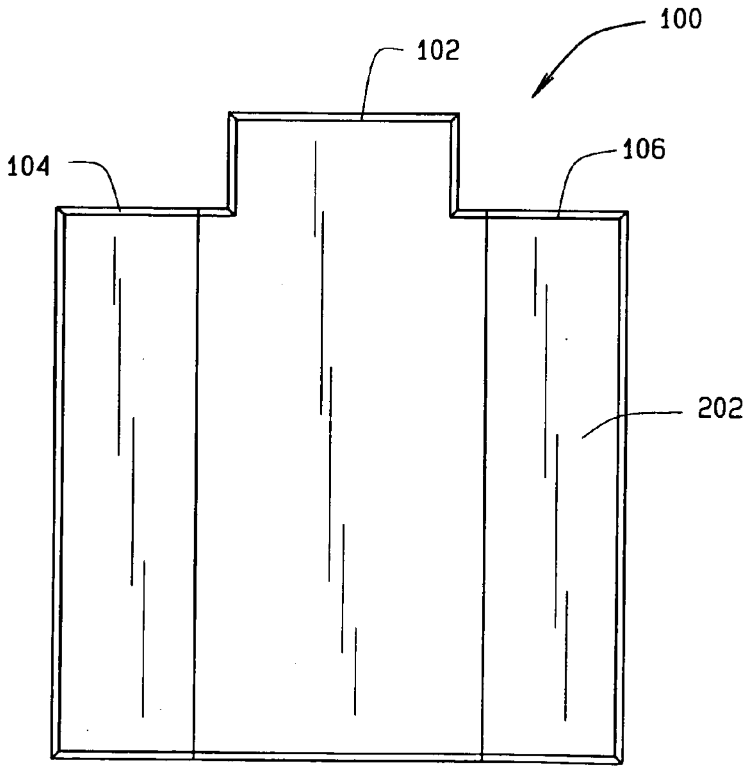
FIG. 2 is a top plan view of the chair pad.
Figure 3:
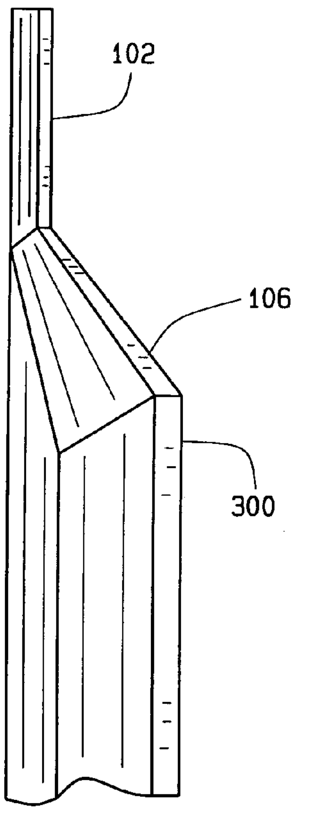
FIG. 3 is a side perspective view of the beveled perimeter edge.

Referring to FIG. 2, a top plan view of the chair pad represents the chair pad lying on a flat surface. Again, the chair pad is shown having a center panel 102 and left and right side panels 104 and 106, respectively. This embodiment shows the chair pad having a substantially flat finished surface 202. Referring to FIG. 3, a side perspective view of the beveled perimeter edge shows the right side panel 106 of the chair pad having a beveled edge 300. The angle of the beveled edge can vary. The chair mat can be folded with the top surface being folded inward or the top surface being folded outward.

Figure 4:
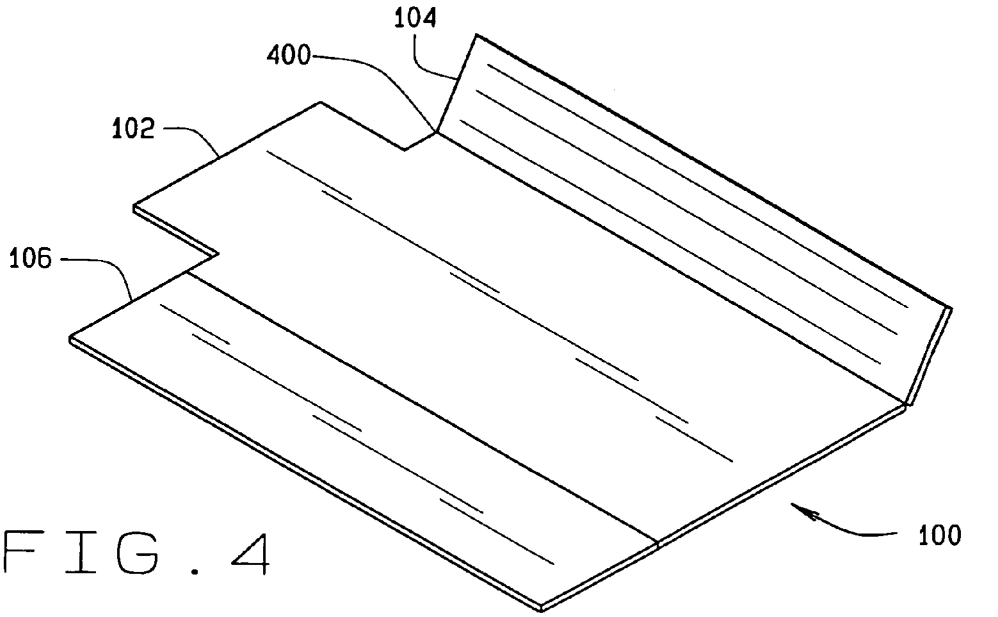
FIG. 4 is a bottom perspective view of the chair pad with the left side panel partially folded for illustration.

Referring to FIG. 4, a bottom perspective view of the chair pad shows the left side panel partially folded in an embodiment with the left and right side panels and the center panel. This figure also reveals the seam 400 between the left side panel 104 and the center panel 102 that allows the ability to fold the left side panel 104. The left side panel appears partially folded onto the center panel 102. The right side panel 106 has a similar seam and a hinged attachment to the center panel such that the right side panel can also fold over onto the center panel 102.

Figure 5:
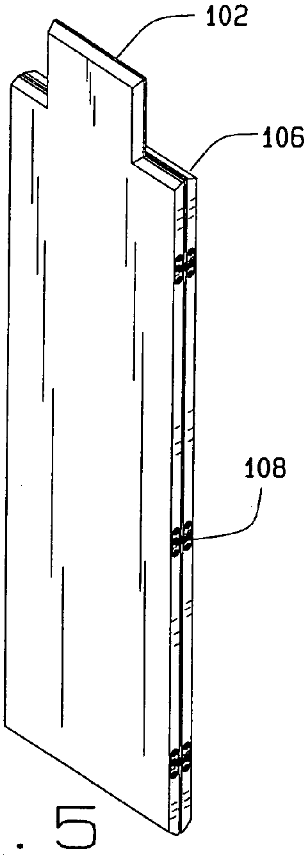
FIG. 5 is a side perspective view with the right side panel folded over onto the center panel.

Referring to FIG. 5, a side perspective view with the right side panel folded over onto the center panel shows the right side panel folded over onto the back side of the center panel 102. This view also reveals that the right side panel 106 having a hinged attachment to the center panel along their respective side edges by a recessed hinge 108. In this embodiment, the right side panel 106 has its longer side edge 502 hingedly attached to the center panel's longer side edge 504. Each of the side edges 502 and 504 have a hinge mounting plate or fastening flange recessed therein.

Figure 6:
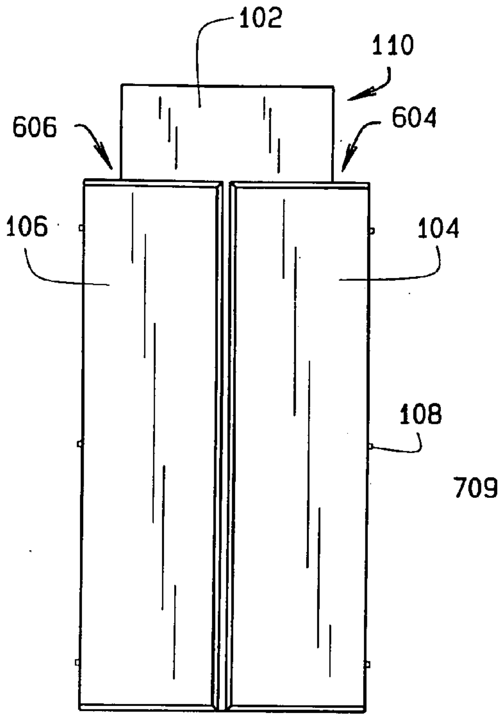
FIG. 6 is a bottom plan view with the left and right panels folded over onto the center panel.

Referring to FIG. 6, a bottom plan view with the left and right panels folded over onto the center panel shows the left and right side panels folded completely over onto the back side of the center panel 102. Alternatively, the hinges 108 can be installed such that the left and right side panels fold in the opposite direction onto the top side of the center panel 102. The center panel 102 has an extension 110 that extends beyond the length of the left and right side panels. The extension 110 creates left and right side wings 602 and 604 of the center panel such that the apparatus attains the dimensions of a standard chair pad.

Figure 7:
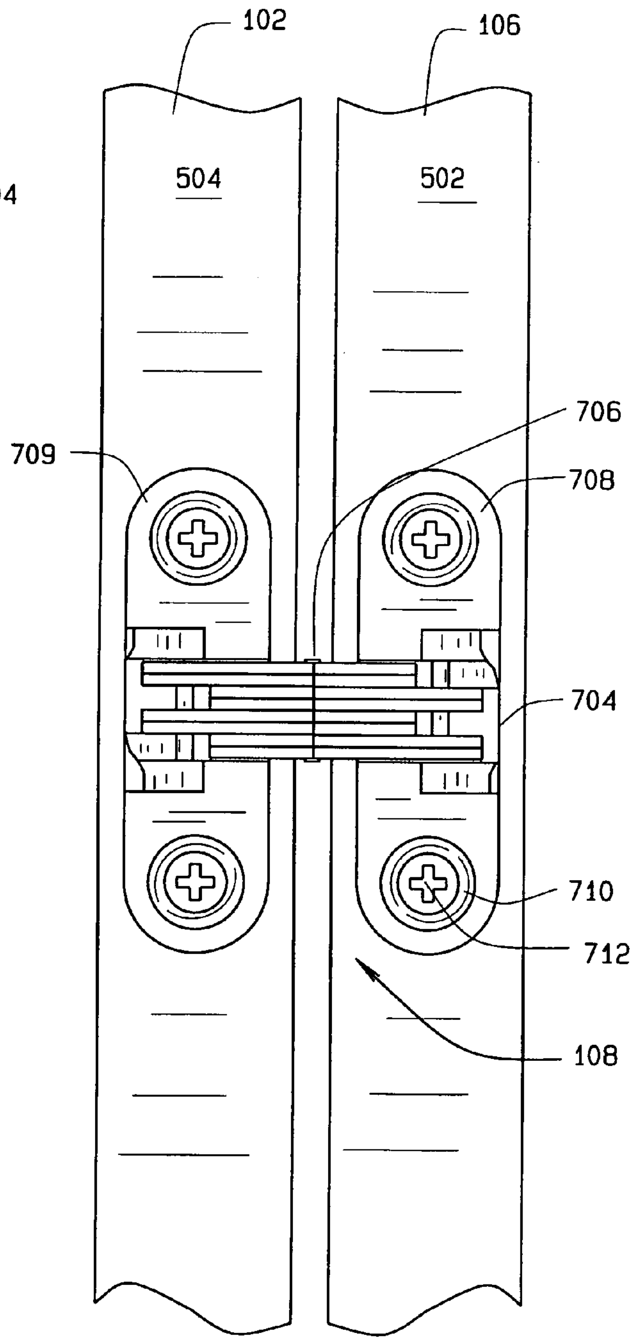
FIG. 7 is a side perspective view of a recessed hinge attaching the center panel to the right side panel and the right side panel is folded over.

Referring to FIG. 7, a side perspective view of a recessed hinge attaching the center panel to the right side panel shows the right side panel folded over. FIG. 7 then provides a close up view of the side edges 504 and 502 in the hinge area. The recessed hinge 108 is shown having a left hinge mounting plate or fastening flange 709 and a right hinge mounting plate or fastening flange 708. The left fastening flange 709 is shown counter sunk or recessed into the side edge 504 of the center panel. The right fastening flange 708 is shown counter sunk or recessed into the side edge 502 of the right side panel 106. The fastening flanges of the hinge are shown being mounted by a screw, for example screw 712, and the screws are counter sunk in the fastening flanges 709 and 708. The fastening flanges have an countersunk installation as at 710. The left and right fastening flanges 709 and 708 act as a mounting means for mounting the left and right mounting members, each recessed inwardly from the side edges 504 and 502 in a recess as at 704. This recessed hinge embodiment 108 also may have multiple crosslink support arms which configure a crosslink support arm assembly 706. The cross-link support arm assembly 706 is operable to hingedly attach the two mounting members, thereby hingedly attaching the center panel to the right panel. The crosslink support arms further operate within the recess 704 when the right side panel is fully extended for lying flat on a surface, such as a floor.

Figure 8:
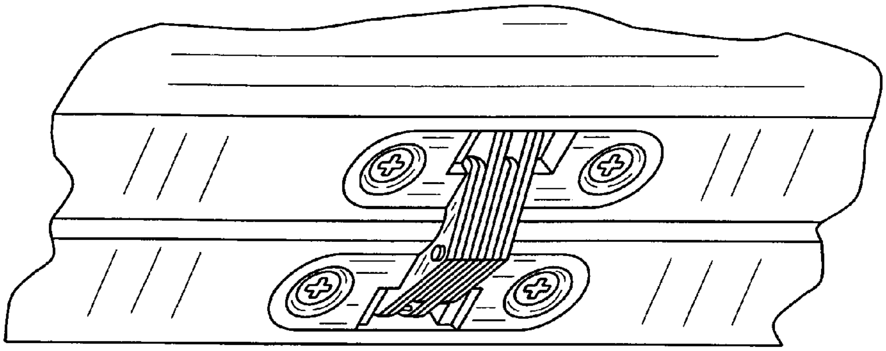
FIG. 8 is a top-side perspective view of the recessed hinge partially inserted in the recess.

Referring to FIG. 8, a top-side perspective view of the recessed hinge partially inserted in the recess 704 shows how the recessed hinge installs by insertion into the center panel side edge recess and the right side panel side edge recess 704.

Figure 9:
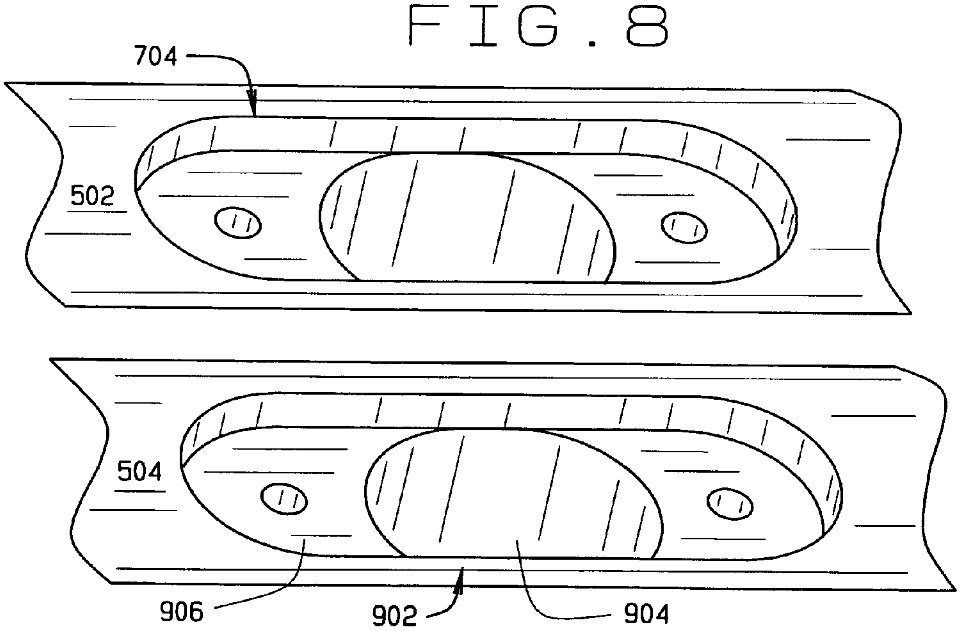
FIG. 9 is a side perspective view of the counter sunk recess extending inward from the side edges of the panels inward within the panels.

Referring to FIG. 9, a side perspective view of the counter sunk recess extending inward from the side edges of the panels inward within the panels shows a close up view of the side edge 504 of the center panel and the side edge 502 of the right side panel without the recessed hinge. FIG. 9 further reveals the recess 704 and the recess 902. Each recess has a flange counter sunk recess area 906 for receiving the mounting flange of the hinged mounting member. Each recess also includes a plug recess area 904 for receiving the plug portion of the recessed hinge mounting member.

Figure 10:
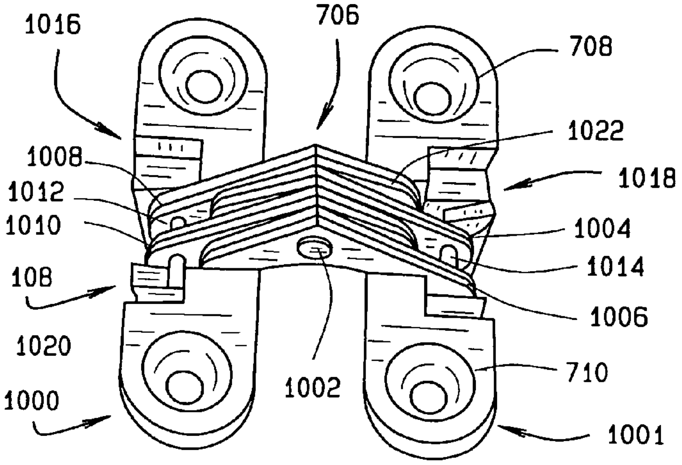
FIGS. 10-16 are various views of the recessed hinge.

Referring to FIGS. 10-16 various views of the recessed hinge are shown. FIG. 10 shows a detailed view of the recessed hinge 108. Each recessed hinge 108 can include a left and right mounting member 1000 and 1001 respectively. Each mounting member will include a mounting flange as at 708. Each flange can include countersinks for receiving mounting screws as at 710. The mounting members hingedly attach by a crosslink support arm assembly 706. The crosslink support arm assembly can include multiple crosslink support arms. The multiple support arms can pivotally interconnect by a central hinge pin 1002. In this embodiment, the crosslink support arm assembly 706 has a plurality of crosslink support arm pairs, for example 1008 and 1004 and additional examples of 1004, 1006, 1008 and 1010. Each support arm pair has a fixed pivot end such as for example 1020 and 2022 and opposing cam following pivoting end. The cam following pivoting end of the crosslink support arm pivotally interconnects about a cam follower hinge pin such as for example 1012 and 1014. Each of the mounting members 1000 and 1001 can have cut out areas in the mounting flange plate and the plug portion for receiving the crosslink support arms.

Figure 11:
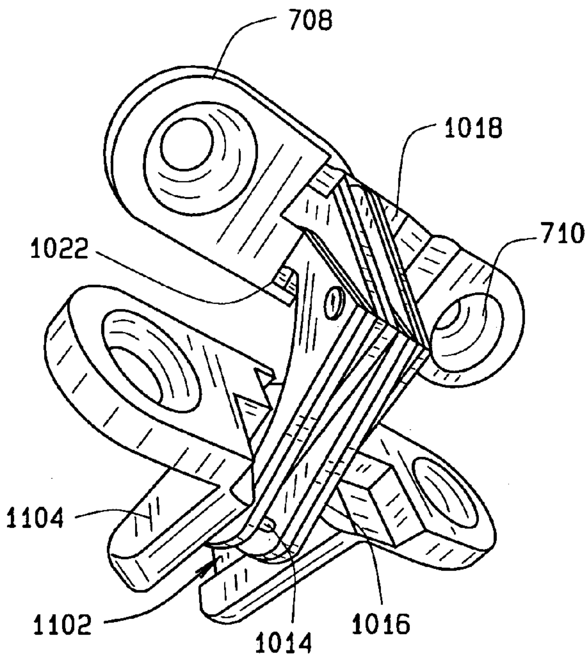

FIG. 11 shows a different view of the recessed hinge. The cut out areas 1016 and 1018 receive the crosslink support arms. As indicated above, the crosslink support arms pivotally interconnect on one end as shown at 1022. The pivotal interconnection occurs in the area of the mounting flange 708. The opposing end of the crosslink support arm can pivotally interconnect to a cam follower hinge pin, for example 1014.

The plug portion 1104 of the mounting member has a cam slot 1102 along which the cam follower hinge pin travels. When the side panels extend outward for lying flat on a floor surface, the crosslink support arm can pivot about the cam follower hinge pin and the cam follower hinge pin can travel along the cam slide 1102 such that the crosslink support arms recess within the center and side panel.

When this occurs, the crosslink support arm essentially disappears from view within the recess of the panel. Recessed hinges of this type allow for the side panels to extend and lay flat on the floor and further provide aesthetic appeal because the hinge is not readily visible from the top or bottom side and further the seams between the side panels and the center panel have a smaller width.

Figure 12:
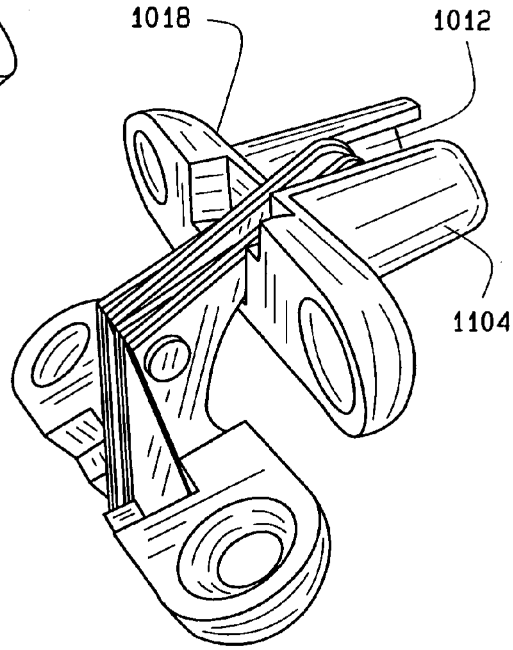

FIG. 12 shows yet another view of the recessed hinge having a plug portion 1104 further having a cam slot 1102 such that the cam follower hinge pin can follow along the cam slot.

Figure 13:
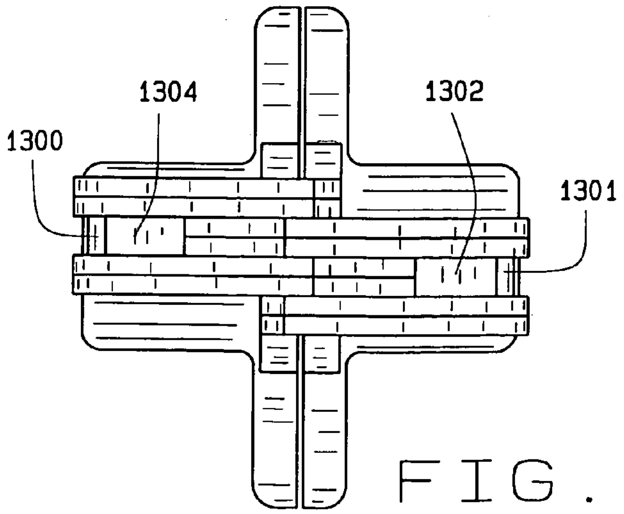
Figure 14:
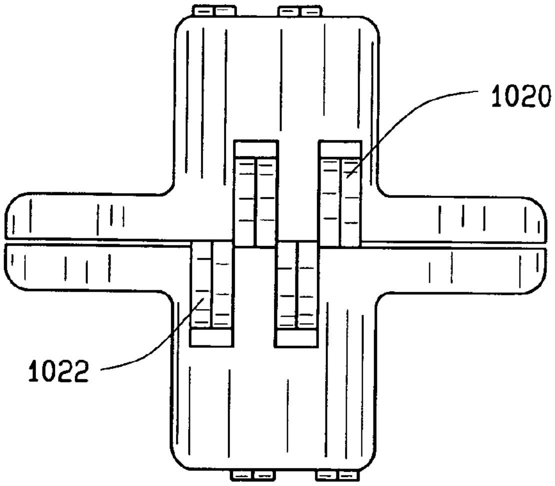
Figure 15:
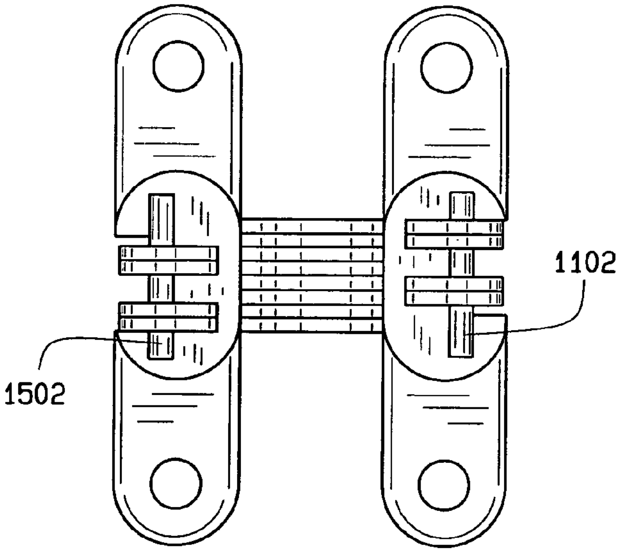
Figure 16:
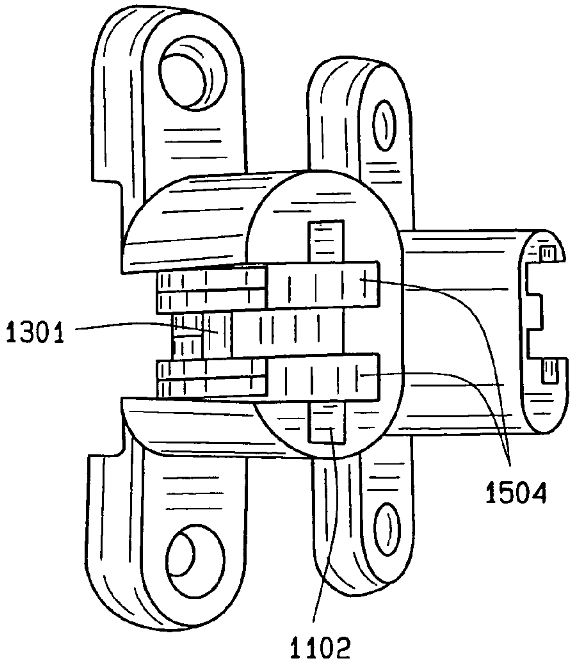

FIG. 13 shows yet another view of the recessed hinge pin and the cam follower hinge pins 1300 and 1301. This figure also reveals the position of the recessed hinge pin when the side panels extend outward for lying flat on a floor. As shown, the cam following hinge pins 1300 and 1301 have traveled along the cam slot such that the crosslink support arms are recessed within the cut out area of the plug portion and further within the recess of the panel. FIG. 14 shows the opposing side of the recessed hinge revealing the pivotal interconnections 1022 and 1020. FIG. 15 further reveals the cam slot and the cam follower hinge pin 1301. This view also reveals a pair of cam slots 1504 for receiving the crosslink support arms which follow along these slots 1504. FIG. 16 further reveals the cam slots 1102 and 1502 for receiving the cam following hinge pins and further reveals the cam slot pairs for receiving the crosslink support arms.

All surface and structural material for the chair pad can be manufactured from 100% solid wood, engineered wood, wood laminate, wood veneer or other wood fibers. The most common material used for similar products is manufactured from various types of resin. The woods used in the manufacturing of this produce include, but are not limited to, various species of bamboo, cherry, teak, rubber tree, oak, eucalyptus and mahogany. In some instances, more than one species and type of wood can be used in the construction of a single office chair pad.

The office chair pad can be constructed with a soft surface backing material, installed on the bottom portion of the chair pad to help protect the surface beneath the chair pad and to deter excessive movement or slipping on the floor or other flat surface. The backing material, made of various materials, can be cut to match the footprint of the chair pad. The backing can be bonded to the underside of the chair pad.

The foldable chair pad can be generally manufactured as three separate portions or panels and hingedly held together by a horizontal recessed metal hinge attached with countersunk screws. This construction provides for the three separate panels to hinge together tightly with little if any visibility from the top surface of any hinge assembly when the unit is in the open or extended position. The recessed installation of the mounting member (mounting flange and plug) provides for added strength and has less visibility to the user and reduces the width of the seam between panels.

The hinge and the multiple sections of the foldable chair pad are manufactured so that when assembled, the foldable chair mat can be produced to fold either inward or outward by simply reversing the hinge. Also, the chair pad can be manufactured with two, three or more hingedly attached panels.

The surface of the office chair pad surface can be stained, veneered or laminated or more than one of these processes or left to its natural wood finish and coated with either multiple layers of polyurethane or UV coatings. The perimeter of the entire office chair pad can be designed with a reducer effect allowing for a gradual sloping angle (beveled edge) for an office chair with or without wheels or casters to depart the office chair pad gradually.

The final product can be both mar and scuff resistant with normal use and care by properly applying the finish. The product also ships via a typical overnight parcel carrier based on their limitations for overall dimensions and weight because of the foldable feature of the chair pad.

The product can be individually packaged for shipping or packaged in bulk on protected pallets or other such items for presentation to distributors and end users.

Figure 17A:
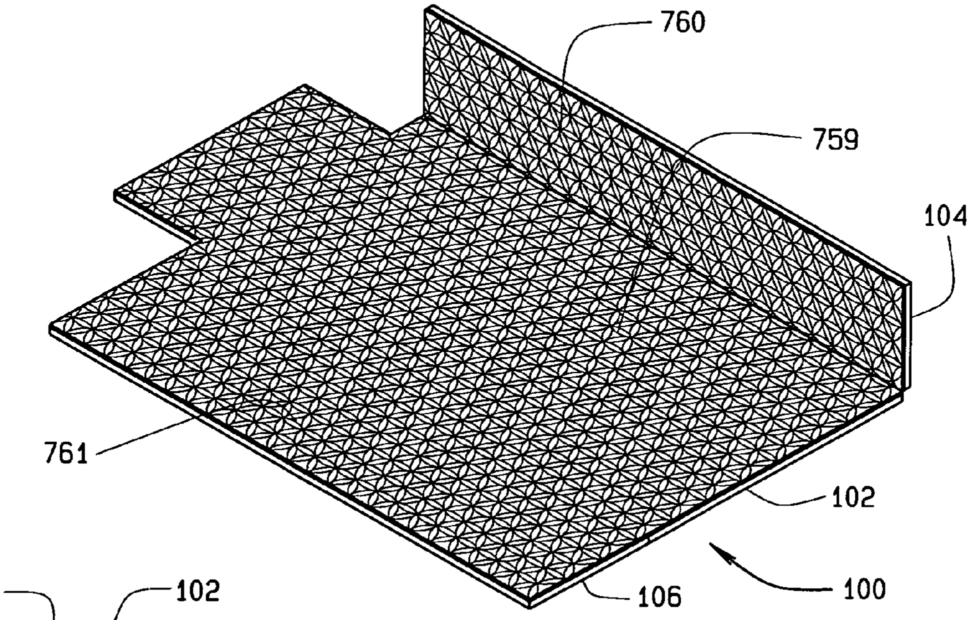
FIG. 17*a* is a perspective view of the bottom of the chair pad when unfolding.
Figure 17B:
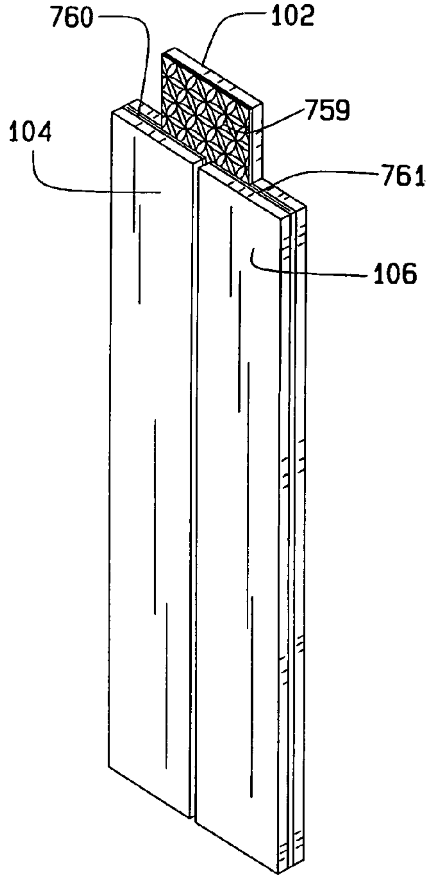
FIG. 17*b* is a perspective view of the folded chair pad with backing layer shown.

A further alternate embodiment of the invention takes form in FIG. 17*a* as a perspective view of the bottom surface of the chair pad as a user unfolds it. This view shows the chair pad with the center and side panels, 102, 104, 106 downward and a backing 759 extending across all of the panels. The backing joins to the panels by one of adhesive, mechanical fasteners, such as staples and tacks, and the like. The backing has reinforcement for its joining to the panels proximate their hinge locations along their lengths as previously described. The backing has wing portions, as at 760 and 761, that correspond to the left side panel 104 and the right side panel 106 respectively. After the side panels unfold, the layer 759 appears upwardly and a user flips the chair pad over so that the backing layer locates upon a floor or other surface. As later shown in FIG. 20, the backing may have multiple layers.

During shipment, storage, and other nonuse, the foldable chair pad has its side panels 104, 106 fold upon the center panel 102. The panels fold inwardly upon the backing. Folding places the backing upon the interior of the fold chair pad with the wood of the panel to the exterior. The side panels pivot upon their longitudinal edges with the backing 759 serving as a hinge with the longitudinal edges of the center panel. The backing has sufficient durability to resist repeated cycles of folding and unfolding along with years of use when unfolded and placed behind a desk or table during use.

Figure 17C:
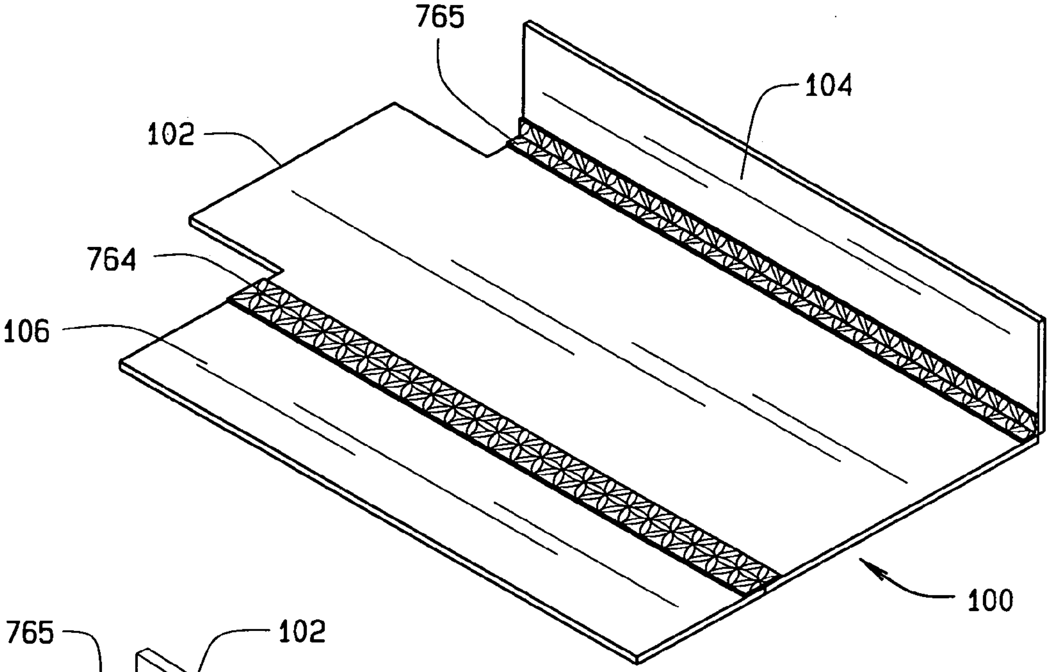
FIG. 17*c* is a perspective view of the bottom of the chair pad when unfolding upon strips of backing layer and FIG. 17*d* is a perspective view of the folded chair pad with the strips of backing layer shown.
Figure 17D:
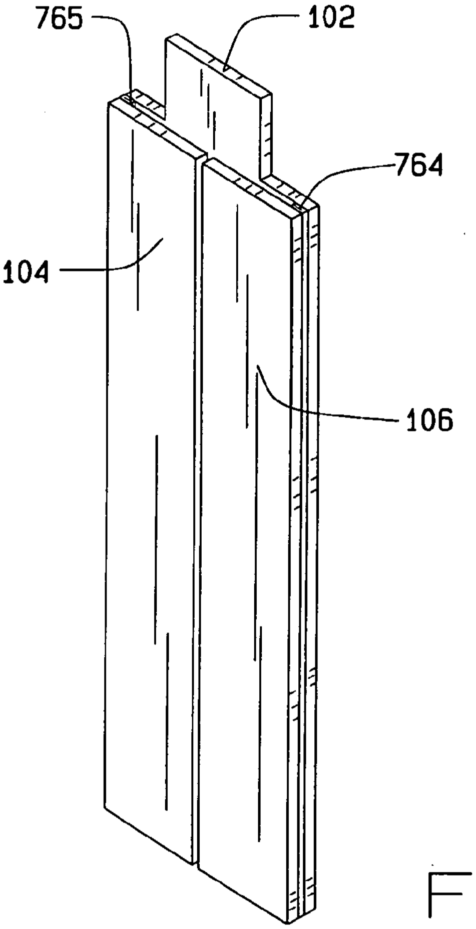

Another alternate embodiment of the invention takes form in FIG. 17*c* again in a perspective view of the bottom surface of the chair pad during unfolding. This view shows the chair pad with the center and side panels, 102, 104, 106 downward and a strip of backing spanning from the longitudinal edge of the center panel to the longitudinal edge of each side panel. Each strip connects a side panel to the center panel and serves as a hinge, similar to a piano hinge. The strip 764 connects the right side panel 106 to the center panel 102 and the strip 765 connects the left side panel 104 to the center panel. As before, the backing joins to the panels by one of adhesive, mechanical fasteners, such as staples and tacks, and the like. The backing has reinforcement in its construction for its primary use as a hinge between adjacent panels, such as additional thickness and select materials resistant to flexure. After the side panels unfold from the center panel along the strips 764, 765, the backing 759 appears upwardly and a user flips the chair pad so that the strips locate upon the floor or other surface. As later shown in FIG. 20, the backing may have multiple layers During periods of nonuse such as shipment and storage, the foldable chair pad has its side panels 104, 106 folded upon the center panel 10 as in FIG. 17*d*. The panels fold inwardly upon the strips 764, 765 of backing. Folding places the strips upon the interior of the folded chair pad, generally folded in half. The side panels pivot upon their longitudinal edges with the strips 764, 765 respectively serving as a hinge with the longitudinal edges of the center panel. The strips have sufficient durability to resist repeated cycles of folding and unfolding over the life cycle of the foldable chair pad.

Figure 17E:
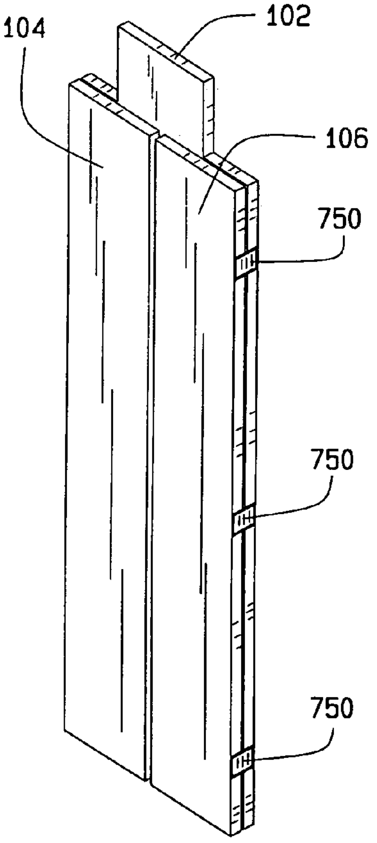
FIG. 17*e* is a perspective view of the folded chair pad including straps as alternate hinges.

A further alternate embodiment of the invention appears in FIG. 17*e* in folded form. The foldable chair pad in this embodiment includes a center panel 102, left side panel 104, and right side panel 106 as previously described. Each side panel has a small gap 150 between it and the center panel 102 when folded upon the center panel. For shipping and storage, the left side panel and the right side panel fold onto the center panel, both upon the same surface of the center panel. The left side panel and the right side panel, hereinafter side panel, fold upon at least one strap, and preferably three straps 750 as shown. The straps allow the side panel to rotate about a longitudinal or lengthwise edge, onto the center panel yet remain connected to the center panel. The straps are preferably rectangular in shape and thin in thickness. The straps secure to the edges of the side panels and the center panel using mechanical fasteners, adhesives, Dutchmen and other fasteners capable of application in rapid manufacturing environments.

Figure 18:
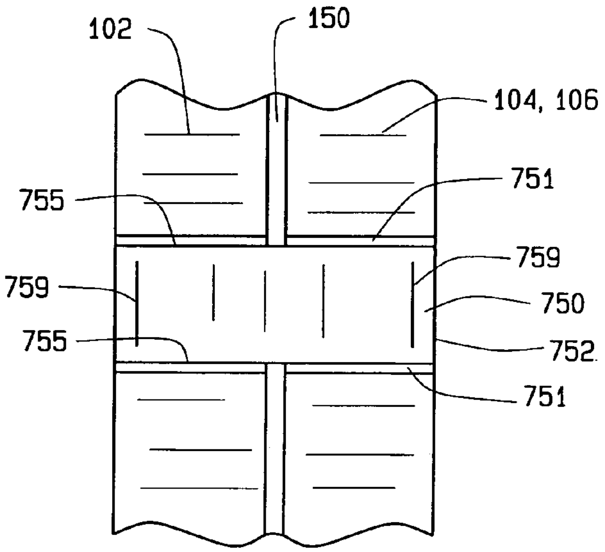
FIG. 18 is a detailed side view of the alternate hinges.

Because the strap is thin and flexible, the strap can bunch or pinch when folded upon itself, as in when a side panel is unfolded from the center panel. FIG. 18 shows a strap recessed into the side panel 104/106 and the center panel 102. The strap has its rectangular shape with two mutually parallel and spaced apart longitudinal edges as at 755 and two mutually parallel and spaced apart lateral edges 752 generally perpendicular to the longitudinal edges. The longitudinal edges have a length approximately that of the combined thicknesses of the side panel and the center panel. The side panels and the center panel each include recesses 751 here shown adjacent and parallel to the longitudinal edges 755. The recesses extend slightly wider than the width of the strap 750. The recesses have a depth slightly more than the thickness of the strap, later shown in FIG. 20. The recesses extend across the thickness of each panel, here shown as two panels. The straps fit within the recesses and become concealed with little pinching or bunching when a side panel is unfolded next to the center panel. In a further alternate embodiment, each strap may be attached upon the edges of the side panel and the center panel however, the strap will fold upon itself thus separating the side panel from the center panel and presenting a visible gap to users of the foldable chair mat.

Figure 19:
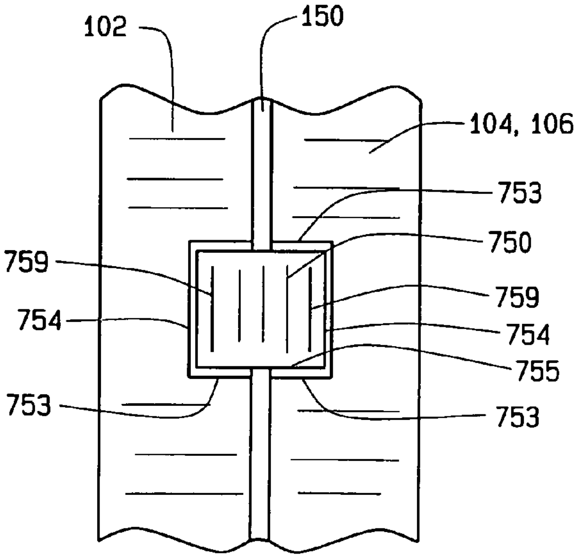
FIG. 19 is a detailed side view of an alternate position of an alternate hinge.

FIG. 19 shows a further alternate embodiment of the foldable chair mat, particularly the strap 750 serving as a hinge. As above, the strap has its rectangular shape with two mutually parallel and spaced apart longitudinal edges as at 755 and two mutually parallel and spaced apart lateral edges 752 generally perpendicular to the longitudinal edges. This figure shows a rectangular strap 750 though smaller than the strap of FIG. 18. The longitudinal edges here though have a length less than the thickness of either the side panel or the center panel. The strap has a recessed location upon the edges of the side panel and the center panel. The recess extends less than the thickness of each panel, concealing the strap inside the panels when unfolded. The recessed location includes a lateral portion as at 754 having a length slightly longer than the lateral edge 752 of the strap, a longitudinal portion as at 753 generally less in length than the lateral portion 754 and the thickness of the side panel or the center panel. The lateral portion 754 is generally parallel to the length of the center panel 102. The shorter longitudinal edge 755 and the corresponding lateral edge 753 allow for lesser use of strap material and a smaller recess than the embodiment shown in FIG. 18. The shorter embodiment of FIG. 19 minimizes pinching and bunching of the strap when the side panel unfolds from the center panel during placement of the foldable chair pad adjacent to a desk, table, or other piece of furniture.

Figure 20:
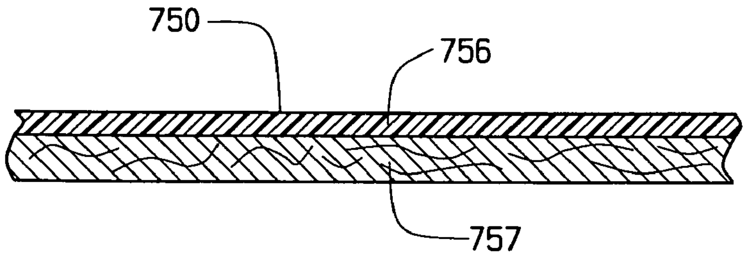
FIG. 20 is a sectional view through an alternate hinge.

Viewing a piece of strap 750 from the side or edge, FIG. 20 shows the construction of a strap. The strap generally has two layers, here shown as a fiber layer 757 in the bottom of the figure and as a backing layer 755 in the top of the figure. The backing layer is generally adjacent to the fiber layer though of a lesser thickness. As shown the backing layer generally parallels the fiber layer. The backing layer joins to the fiber layer using adhesive, cohesive, electrostatic, and like means of joining large planar surfaces. In the preferred embodiment, the fiber layer has a greater thickness than the backing layer.

Figure 21:
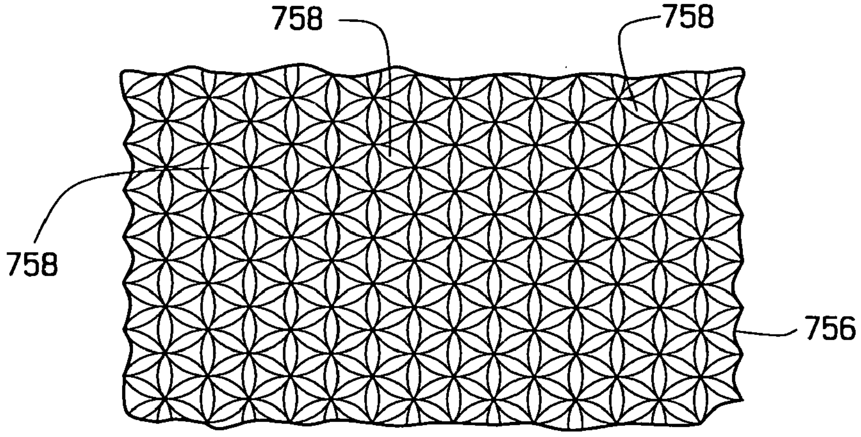
FIG. 21 is a top view of the alternate hinge.

The backing layer 756 includes reinforcement as shown in FIG. 21 for the strap. In the preferred embodiment, the reinforcement has a plurality of ribs 758 intersecting in a pattern forming spaced apart polygonal shapes, here showing hexagons. The ribs 758 generally extend outwardly from the backing layer forming a network of raised lines mutually reinforcing at intersections of the ribs. The ribs reinforce the backing layer to withstand the rigors of multiple folding and unfolding of the side panels from the center panel over the design lifetime of the foldable chair pad.

Figure 22:
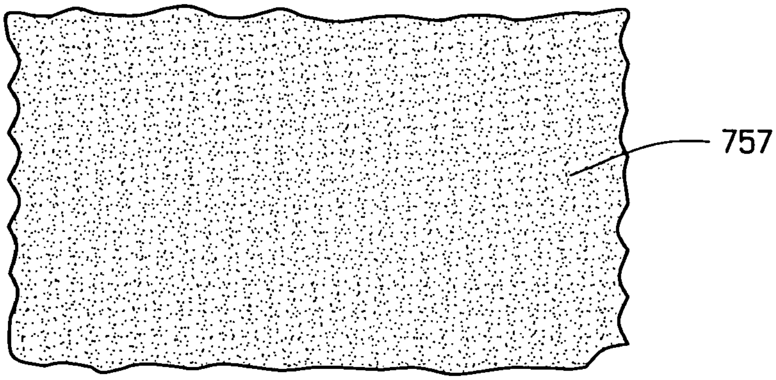
FIG. 22 is a bottom view of the alternate hinge.

Opposite the backing layer, FIG. 22 shows the fiber layer 7 of a strap 750. The fiber layer includes various fibers pressed into a planar sheet similar to felting. The fibers come from various materials such as cotton, linen, rags, polymer strands, textile waste products, plant rinds, and the like. The fiber layer remains consistent and resistant to abrasion, bending, flexure, and other abuse as the individual fibers interlock and interweave. With the backing layer installed towards the center panel, the fiber layer of a strap extends outwardly from the foldable chair mat and can grip the adjacent surface, such as a floor, thus preventing the foldable chair mat from sliding and dampening sound from the chair mat scraping upon a surface.

The various chair pad examples shown above illustrate a novel foldable chair pad construction. A user of the present invention may choose any of the above chair pad construction embodiments, or an equivalent thereof, depending upon the desired application. In this regard, it is recognized that various forms of the foldable chair pad could be utilized, such as for example a two panel, three panel, four panel, or greater without departing from the spirit and scope of the present invention.

From the aforementioned description, a foldable chair mat has been described. The foldable chair mat is uniquely capable of folding wooden panels into a light compact form for shipping and eventual placement at its final location. The foldable chair mat may be manufactured from many materials, including but not limited to, wood, bamboo, polymers, engineered textiles, ferrous and non-ferrous metals and their alloys, and composites.

We claim:

1. A foldable chair pad formed of wood of the category of bamboo and teak, comprising:

at least two foldable panels and a center panel , each of said panels having a length, at least one edge parallel to the length, and a bottom surface, said panels being arranged side by side along their lengths when unfolded generally parallel to their length;

at least one backing upon the bottom surface of each of said panels, said at least one backing having at least one layer, and said at least one backing hingedly connecting said panels upon their longitudinal edges;

said foldable panels may be pivoted upon said backing into an overlying position upon the center panel for storage, and the outer edges of said two foldable panels lying in proximity with an edge of said center panel when folded into the storage condition, wherein said backing allows pivoting of said foldable panels upon the center panel where their edges abut as during usage in a flattened usable condition;

said foldable panels being a left side panel, a right side panel, and a center panel being intermediate thereof;

said backing at least partially covering the bottom surface of said center panel and said left side panel, and said backing at least partially covering the bottom surface of said center panel and said right side panel and pivotally attaching said center panel to said left side panel and said center panel to said right side panel, wherein said backing functions as a hinge to allow folding of said panels into a stackable position as during nonuse, and unfolding into a flattened position for placement upon a surface during usage;

said left side panel and said right side panel being substantially shorter than said center panel;

said backing having a backing layer and a fiber layer joining to said backing layer, said layers being adhered to the under surface of said left side panel, the right side panel and said center panel through use of an adhesive;

wherein said backing layer functions as a soft surface backing for the foldable chair pad when resting upon a surface, and said fiber layer functions as a hinge for allowing folding of the left side panel and right side panel onto the center panel for storage.

2. The foldable chair pad of claim 1 further comprising: said backing layer including a pattern of reinforcing ribs thereon.

3. The foldable chair pad of claim 2 further comprising: said pattern of reinforcing ribs forming hexagons.

4. The foldable chair pad of claim 1 wherein said fiber layer includes fibers from cotton, linen, rags, polymer strands, textile waste products, and plant rinds and said fiber layer includes fibers that interlock and interweave wherein said fiber layer resists abrasion and repeated flexure during usage.

* * * * *